United States Patent [19]

Araki

[11] Patent Number: 4,680,743

[45] Date of Patent: Jul. 14, 1987

[54] OPTICAL PARTS DRIVING MECHANISM IN OPTICAL INFORMATION READER

[76] Inventor: Yoshitsugu Araki, c/o Pioneer Electronic Corporation, Tokorozawa Factory, 2610, Hanazono 4 chome, Tokorozawa-shi, Saitama, 359, Japan

[21] Appl. No.: 604,027

[22] Filed: Apr. 26, 1984

[30] Foreign Application Priority Data

Apr. 28, 1983 [JP] Japan .............................. 58-63037[U]

[51] Int. Cl.⁴ .............................................. G11B 7/09
[52] U.S. Cl. ........................................ 369/44; 369/45; 369/219
[58] Field of Search ................... 369/45, 44, 215, 219, 369/220, 221; 350/255, 252

[56] References Cited

U.S. PATENT DOCUMENTS

| 4,135,206 | 1/1979 | Kleuters | 369/45 |
| 4,367,543 | 1/1983 | Araki | 369/45 |
| 4,394,755 | 7/1983 | Gijzen | 369/45 |

Primary Examiner—Alan Faber

[57] ABSTRACT

A new optical parts driving mechanism in an optical information reader is provided. In general, the reader reads information contained in an information recording medium such as a disc having a driving mechanism axially extending in the center thereof. The optical parts driving mechanism has a lens holder adapted to travel parallel to the disc and carrying an objective at a portion substantially closest to said disc driving mechanism. Said driving mechanism further has focus direction drive and track direction drive. The track direction drive is mounted to said lens holder on an opposite side thereof with respect to said disc driving mechanism.

6 Claims, 6 Drawing Figures

OPTICAL PARTS DRIVING MECHANISM IN OPTICAL INFORMATION READER

BACKGROUND OF THE INVENTION

The present invention relates to a driving mechanism for optical parts, especially an objective of a pickup in an optical information reader which reads information contained in a disc-shaped information recording medium.

In conventional optical information readers of a video disc player, D.A.D. (Digital Audio Disc) player or the like, a driving mechanism for a pickup including an objective is constructed as shown in FIG. 1, for example.

A pickup D in which an objective B is disposed in a holding cylinder C in order to condense light from a light source or reflected light from a disc A to be focused is supported on a mount frame F by a damper E in such a manner as to reciprocate. As a driving mechanism G for moving the holding cylinder C in the focus direction perpendicularly to the disc surface A in order to adjust the focus of the above objective B to the disc A, a driving coil I wound round a bobbin H mounted on the lower outer periphery of the holding cylinder C is inserted in a magnetic gap K of a magnetic circuit g for the focus direction drive, and as a driving mechanism J for moving the holding cylinder C in the tracking direction along the radius of the disc A, driving coils L are respectively wound round two bobbins M, M in the opposite phase, which are disposed at the symmetrical positions of the outer periphery of the holding cylinder C, and magnets O secured to each inside of the described mount frames F are respectively inserted in the bobbins M, M. In case of driving the objective B in the focus direction, the driving coil I is energized so that the holding cylinder C is driven by the magnetic interaction with the magnetic circuit g. Thus, the focus of the objective B is adjusted. In case of driving the objective B in the tracking direction, the driving coils L, L are energized for the tracking direction drive so that the holding cylinder C is driven by the magnetic interaction with the magnets O.

In case of reproducing a signal recorded on a disc by the thus constructed driving mechanisms, the pickup has to be moved along the radius of the disc A by movement of a slide base (not shown). The driving mechanism portion for the pickup D, however, is large-sized as described above and the pickup D cannot approach sufficiently the axis of a motor P so that it is impossible to use a large-sized motor P with a large output for reproduction. Accordingly, the driving torque of the motor P is decreased so that the rise time of an apparatus is lengthened, and the response in its initial operation gets worse. These problems are serious in case of using a small-diameter compact disc as an information recording medium.

SUMMARY OF THE INVENTION

The present invention has been proposed in the light of the above circumstances. It is an object of the present invention to provide an optical parts driving mechanism in an optical information reader, which is small-sized and capable of high-fidelity reproduction of a signal recorded on a disc and using a large-sized motor with a large output for rotating a signal recording medium so as to shorten the rise time of an apparatus and attain good response in its initial operation.

DETAILED DESCRIPTION OF THE EMBODIMENTS

Figure 1:
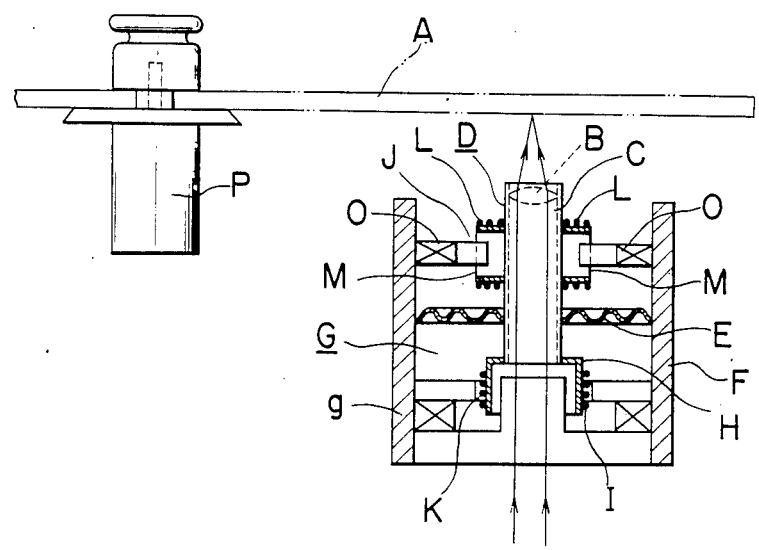
FIG. 1 is a sectional view showing a conventional information reader.
Figure 2:
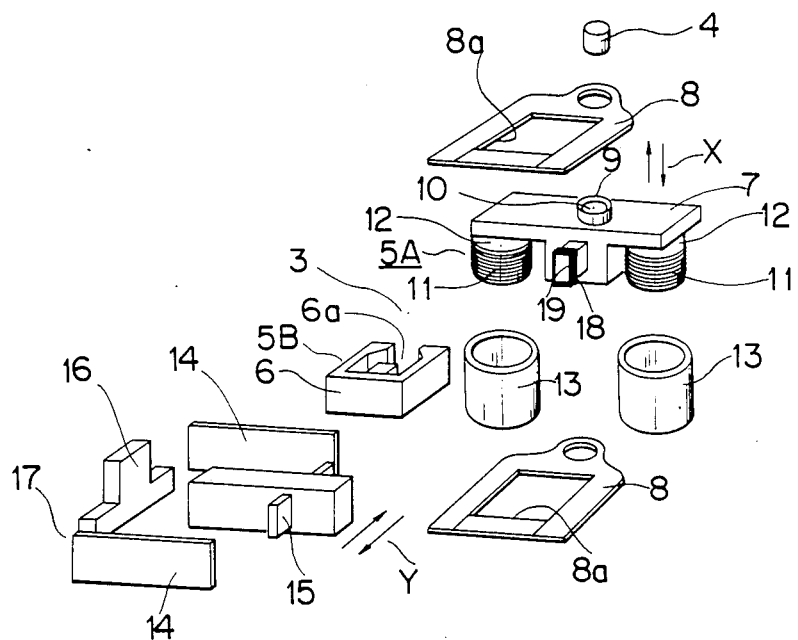
FIG. 2 is an exploded perspective view showing one embodiment of the present invention.
Figure 3:
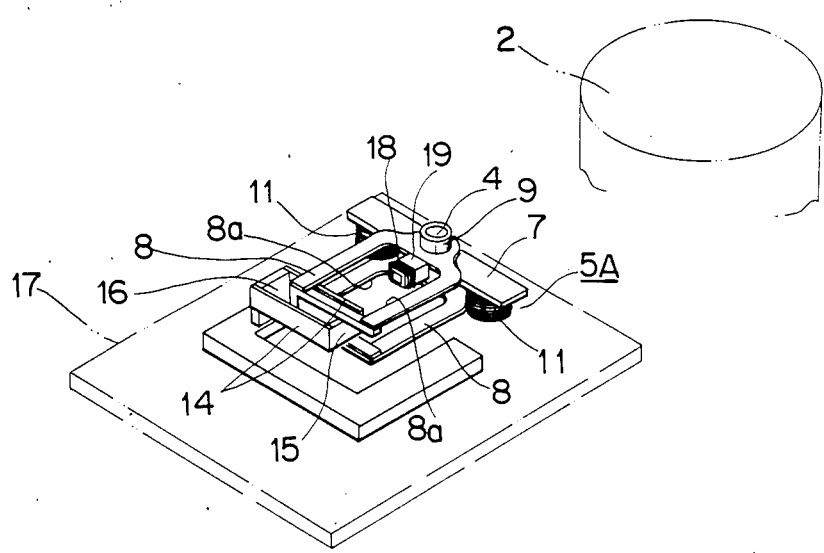
FIG. 3 is a perspective view showing the assembled state of the above embodiment.
Figure 4:
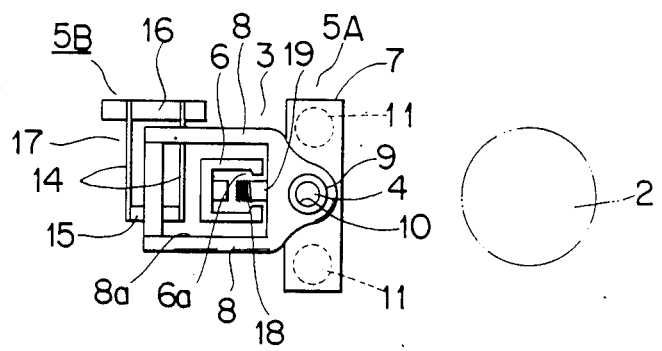
FIG. 4 is a plan view showing the assembling state of the above embodiment.
Figure 5:
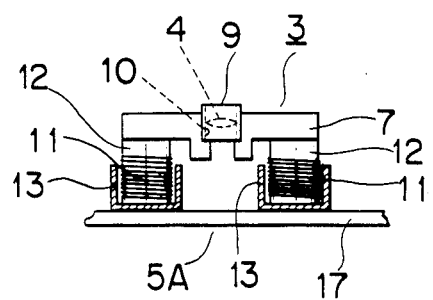
FIG. 5 is a front view of the above embodiment.
Figure 6:
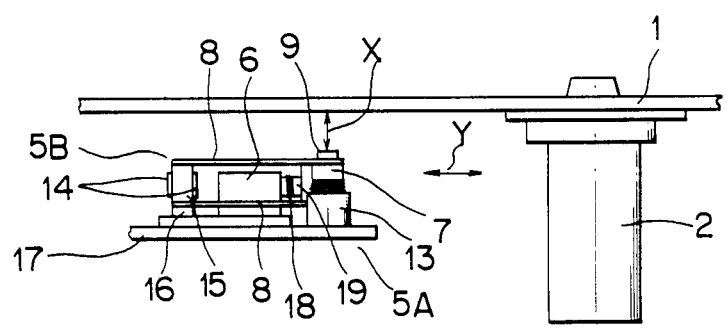
FIG. 6 is a sectional view of the above embodiment.

The present invention will now be described by way of one embodiment shown in FIGS. 2 to 6.

The numeral 1 designates a disc, and the numeral 2 designates a motor for driving the disc 1.

The driving mechanism 3 of the present embodiment basically comprises the first direction driving means 5A adapted to drive in such a manner as to adjust the focal distance of an objective 4 to the disc 1 driven by a disc driving motor 2 axially extending in the center of the disc and the second direction driving means 5B adapted to drive in direction Y(parallel to disc 1 and perpendicular to the driving direction X of the first direction driving means 5A). In this case, the driving direction of the first direction driving means 5A is the focus direction, and the driving direction of the second direction driving means 5B is the tracking direction.

The first direction driving means 5A is provided with two leaf springs 8, 8 disposed parallel to the disc 1 as a flexible support member, which are adapted to clamp and fix a substantially T-shaped lens holder 7 at the front. The described objective 4 is fitted in a fitting hole 10 of a support cylinder 9 mounted on the above lens holder 7. Said support cylinder 9 is provided on the lens holder 7 at a portion substantially closest to said disc driving motor 2. The numeral 11 designates a pair of driving coils for the focus direction drive. The respective driving coils 11, 11 are wound round the respective peripheries of bobbins 12, 12 fixed to right and left lower surfaces of the above lens holder 7, which are inserted in a pair of cylindrical magnetic circuit members 13, 13.

The second direction driving means 5B is provided with two leaf springs 14, 14 disposed parallel to each other to the above leaf springs 8, 8 and with a coupling member 15 interposed between the forward end portions of two leaf springs 14, 14, wherein the coupling member 15 is clamped and fixed between the above leaf springs 8, 8 to incorporate the leaf springs 14 with the above leaf springs 8, 8. One of the above leaf springs 14 is clamped between the upper and lower leaf springs 8, 8 of the above first direction driving means 5A to be disposed at a right angle thereto in the level overlapping state and incorporated. The numeral 16 is a fixing coupling member which is interposed between the above two leaf springs 8, 8 and fixed to a movable base 17 capable of moving along the radius direction of the disc 1. Therefore, said movable base 17 causes the lens holder 7 to travel parallel to the disc. The numeral 18 is a driving coil for the tracking direction drive, which is wound round a coil mount piece 19 projected from the opposite side of the above lens holder 7 with respect to the described driving motor 2. The driving coil 18 is inserted in a magnetic gap 6a of a magnetic circuit member 6 for the tracking direction drive. Said member 6 is inserted in storing holes 8a, 8a formed in the described two leaf springs 8, 8 and fixed on the movable base 17.

One embodiment of the present invention is constructed as described above, wherein when an electric current is applied to the driving coils 11, 11 for the focus direction drive, which are disposed on the right and left lower surfaces of the lens holder 7, as the driving coils 11, 11 are influenced by magnetic flux of the cylindrical magnetic circuits 13, 13 where the coils 11, 11 are inserted, two leaf springs 8, 8 disposed parallel to the disc 1 are bent to reciprocate, so that the lens holder 7 having the objective 4 fitted and retained in the mount hole 10 thereof is driven in perpendicular directions toward and away from the disc 1, that is, in direction of X as the focus direction to adjust the focal distance of the objective 4 to the disc 1. In this case, the driving coils 11, 11 for the focus direction drive are fixed to the right and left lower surfaces of the lens holder 7 and inserted in the cylindrical magnetic circuits 13, 13, and further between upper and lower leaf springs 8, 8, leaf springs 14, 14 for the tracking direction drive are disposed at a right angle thereto and clamped and fixed therebetween. Therefore, the whole form of the driving mechanism 3 is flat.

When the driving coil 18 for the tracking direction drive is energized, the driving coil 18 is inserted in the magnetic gap 6a of the magnetic circuit 6 for the tracking direction drive to get passing magnetic flux from the magnetic circuit 6, so that two leaf springs 14, 14 disposed between two leaf springs 8, 8 for the focus direction drive at a right angle thereto resiliently support the lens holder 7 in cooperation with said two leaf springs 8, 8. Thus, the lens holder 7 is driven to reciprocate in the tracking direction toward and away from the center of the disc 1, that is, in direction Y. In this case, the magnetic circuit member 6 for the tracking direction drive is stored in the storing holes 8a, 8a of two leaf springs 8, 8 for the focus direction drive on the opposite side to the motor 2 for driving the disc 1 and fixed in the movable base 17, and one leaf spring 14 of two leaf springs 14, 14 for the tracking direction drive is clamped and fixed between the leaf springs 8, 8 for the focus direction drive and incorporated therewith in the level overlapping state, so that the second direction driving means 5B for the tracking direction drive is reduced to compact size in level direction. Therefore, a large-diameter motor 2 with a large output can be used for driving the disc 1 so as to improve the rise time and the response in its initial operation.

As the magnetic circuit member 6 for the tracking direction drive, as described above, may be inserted in the storing holes 8a, 8a mounted on two leaf springs 8, 8 for the focus direction drive and fixed to the movable base 17 by soldering or the like, the circuit member 6 can be easily incorporated therewith.

Though in the above embodiment, two equalizer leaf springs 8, 8 and 14, 14 are respectively used as a flexible support member, this shall not be interpreted as limitative of the invention. It is also needless to say that although two leaf springs 8, 8 and 14, 14 are used in the embodiment, each leaf spring 8 and 14 can be arranged in a single or a plural to form the first focus direction driving means 5A and the second tracking direction driving means 5B, respectively.

In the above embodiment, the driving mechanism 3 is arranged to drive in the focus direction and tracking direction using leaf springs 8, 14. If other leaf springs are disposed parallel at a right angle to the leaf springs 14, 14 for the tracking direction drive in one plane and coupled thereto, the driving mechanism can be formed in such a manner as to drive in the focus direction, in the tracking direction and in tangential direction.

It will be apparent from the foregoing that the present invention achieves an optical parts driving mechanism in an optical information reader which is characterized in that the track direction drive means is mounted to the lens holder on an opposite side thereof with respect to the disc drive mechanism. With this structure, the reader can approach sufficiently toward the center of the disc, thus eliminating the need for reducing the size of the motor which inevitably leads to the decrease in motor torque.

What is claimed is:

1. An optical parts driving mechanism in an optical information reader reading information contained in an information recording medium in the form of a disc having disc driving mechanism axially extending in the center thereof, said optical parts driving mechanism comprising a lens holder adapted to travel generally parallel to the disc and carrying an objective at a portion of said lens holder substantially closest to said disc driving mechanism, said objective having an axis being located substantially at an end of said optical parts driving mechanism located closest to said motor axis;

focus direction drive means mounted to said lens holder to drive said lens in generally perpendicular directions toward and away from said disc; and track direction drive means mounted to said lens holder on an opposite side thereof with respect to said disc driving mechanism to drive said lens holder toward and away from the center of the disc, said track direction drive means including a track direction drive mechanism located substantially entirely at the opposite end of said optical parts driving mechanism, said track direction drive means thereby being mounted nonconcentrically with respect to said objective axis to thereby avoid placement of parts of said track direction drive mechanism between the objective axis and the motor axis to enable the objective to approach the center of said disc.

2. An optical parts driving mechanism according to claim 1, wherein said lens holder has a pair of bobbings on an opposite side thereof with respect to said disc, said focus direction drive means including a pair of driving coil wound round said respective bobbins and a pair of first magnetic circuit members into which said coils are inserted.

3. An optical parts driving mechanism according to claim 1, wherein said lens holder has a coil mount piece projected from the opposite side thereof with respect to said disc driving mechanism, said track direction drive means including a driving coil wound round said coil mount piece and a second magnetic circuit member into which said driving coil is inserted.

4. An optical parts driving mechanism according to claim 1, wherein said lens holder is resiliently supported.

5. An optical parts driving mechanism according to claim 2, wherein said lens holder is resiliently supported.

6. An optical parts driving mechanism according to claim 3, wherein said lens holder is resiliently supported.

* * * * *

UNITED STATES PATENT AND TRADEMARK OFFICE
CERTIFICATE OF CORRECTION

PATENT NO. : 4,680,743

DATED : July 14, 1987

INVENTOR(S) : Yoshitsugu ARAKI

It is certified that error appears in the above-identified patent and that said Letters Patent is hereby corrected as shown below:

Cover page, between items [76] and [21], please insert
--[73] Assignee: Pioneer Electronic Corporation, Japan--

Signed and Sealed this

Fifth Day of January, 1988

Attest:

DONALD J. QUIGG

Attesting Officer

Commissioner of Patents and Trademarks